United States Patent [19]
Fujita et al.

[11] Patent Number: 5,704,056
[45] Date of Patent: Dec. 30, 1997

[54] CACHE-DATA TRANSFER SYSTEM

[75] Inventors: Ryuji Fujita; Hirohide Sugahara, both of Kawasaki, Japan

[73] Assignee: Fujitsu Limited, Kawasaki, Japan

[21] Appl. No.: 618,275

[22] Filed: Mar. 18, 1996

Related U.S. Application Data

[63] Continuation of Ser. No. 145,563, Nov. 4, 1993, abandoned.

[30] Foreign Application Priority Data

Nov. 4, 1992 [JP] Japan ................................ 4-294908

[51] Int. Cl.⁶ .................................................. G06F 12/00
[52] U.S. Cl. .................... 395/445; 395/250; 364/243.41; 364/243.45; 364/260; 364/254.9
[58] Field of Search ............................. 395/445, 452, 395/446, 427, 250

[56] References Cited

U.S. PATENT DOCUMENTS

| | | | |
|---|---|---|---|
| 5,377,345 | 12/1994 | Chang et al. | 395/425 |
| 5,392,417 | 2/1995 | Iyengar et al. | 395/425 |
| 5,394,533 | 2/1995 | Doi et al. | 395/425 |

FOREIGN PATENT DOCUMENTS

| | | |
|---|---|---|
| 61-166651 | 7/1986 | Japan. |
| 2-301843 | 12/1990 | Japan. |
| 4-289938 | 10/1992 | Japan. |

*Primary Examiner*—Kevin J. Teska
*Assistant Examiner*—Ayni Mohamed
*Attorney, Agent, or Firm*—Staas & Halsey

[57] ABSTRACT

The present invention provides a cache-data transfer system improving a cache-hit rate by making a block size of the external cache memory longer than the block size of an internal cache memory. The system makes a block size of the external cache memory longer than a block size of the internal cache memory by inserting a data transfer process which transfers a data from the storage means to only the external cache memory during a data transfer process from the storage means to the internal cache memory and the external cache memory.

10 Claims, 6 Drawing Sheets

(OPERATION AT CACHE MISS HIT)

CACHE-DATA TRANSFER SYSTEM

This application is a continuation of application Ser. No. 08/145,563, filed Nov. 4, 1993, now abandoned.

BACKGROUND OF THE INVENTION

1. Field of the Invention

The present invention relates to a cache-data transfer system in a system including a microprocessor and a cache memory.

2. Description of the Related Art

In a conventional cache-data transfer system, the system includes an internal cache memory and an external cache memory. The internal cache memory and the external cache memory have the same block size.

In the above conventional system, the internal cache memory has a small capacity, so the block size of the internal cache memory must be small, such as 4 words, and the block size of the external cache memory is also small. Therefore, the system has a problem that a cache-hit rate of the system cannot be improved even if the system is provided with an external cache memory with a large capacity but with a short block size.

SUMMARY OF THE INVENTION

Therefore, an object of the present invention is to provide a cache-data transfer system improving the cache-hit rate by making a block size of the external cache memory longer than a block size of the internal cache memory.

To achieve the above object, a cache-data transfer system of the present invention comprises a storage unit for storing programs and data to be processed, a microprocessor operated in accordance with the programs and including an internal cache memory accessed at high speed, an external cache memory provided outside of the microprocessor and having a larger capacity than the internal cache memory, and a memory control unit to control the storage unit and the external cache memory. In the present invention, the memory control unit makes a block size of the external cache memory longer than a block size of the internal cache memory by inserting a data transfer process which transfers data from the storage unit to only the external cache memory during a data transfer process which transfers data from the storage unit to the internal cache memory and the external cache memory.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Before describing the embodiment of the present invention, the related art and the disadvantages therein will be described with reference to FIG. 6.

Figure 6:
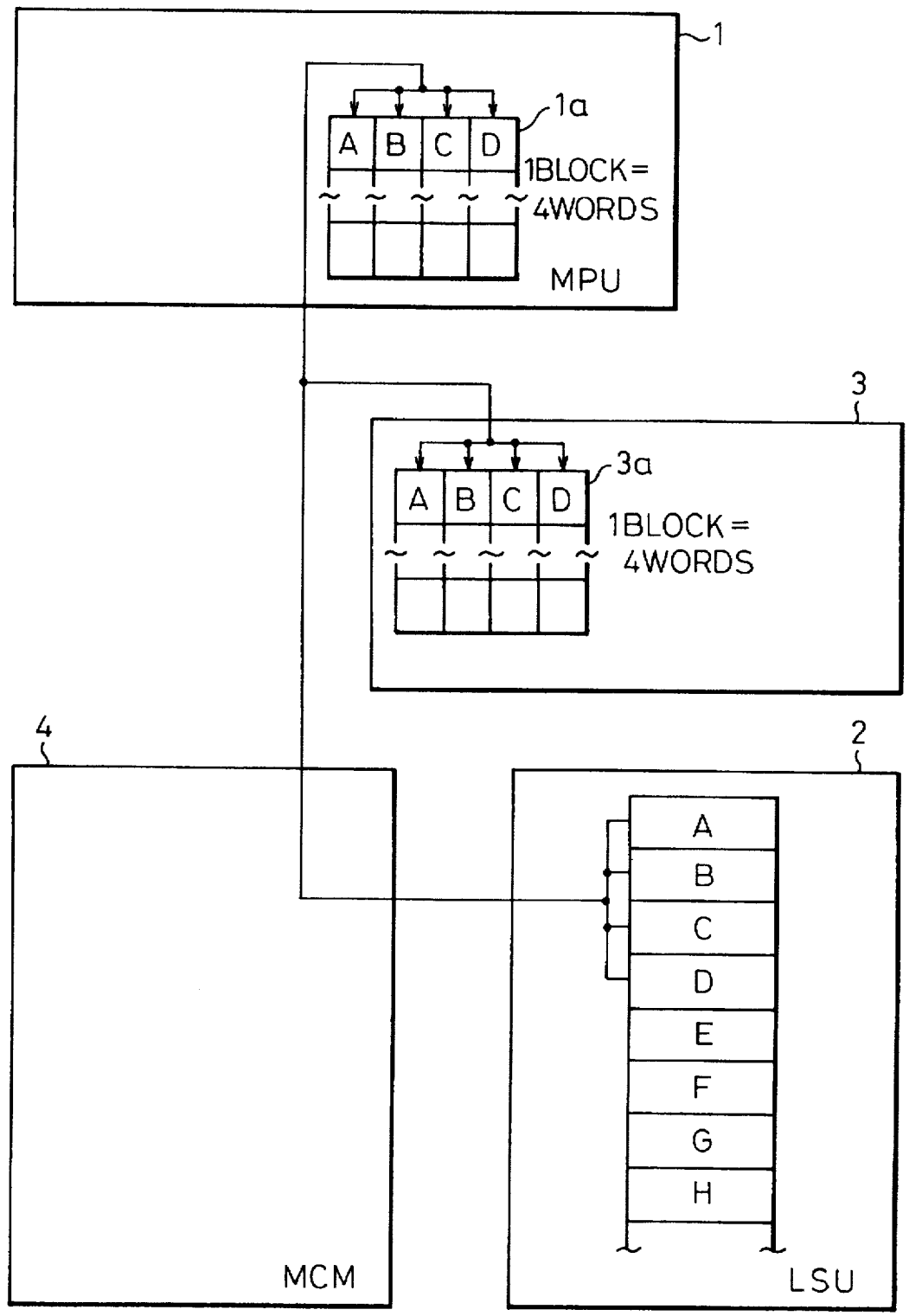
FIG. 6 is a view showing a conventional cache-data transfer system.

In the FIG. 6, reference number 1 shows a micro processing unit (MPU), reference number 2 shows a local storage unit (LSU), reference number 3 shows an external cache memory, and reference number 4 shows a memory control module (MCM) which controls the LSU 2 and the external cache memory 3. The MPU 1 includes an internal cache memory 1a to store word-unit data A, B, C, D, ... transferred from the LSU 2. The cache memory 1a has a number of blocks each formed by 4 words. The external cache memory 3 has a number of short blocks 3a and each block size is formed to be the same as the block size of the internal cache memory 1a. The MCM 4 controls data transferring from the LSU 2 to the short blocks 3a of the internal cache memory 1a and the external cache memory 3.

In the above conventional system, the internal cache memory 1a has a small capacity, so the block size of the internal cache memory 1a must be small, such as four words. Therefore, the system has a problem that a cache-hit rate of the system cannot be improved even if the external cache memory 3 having a large capacity and a short block size is added to the system.

Figure 1:
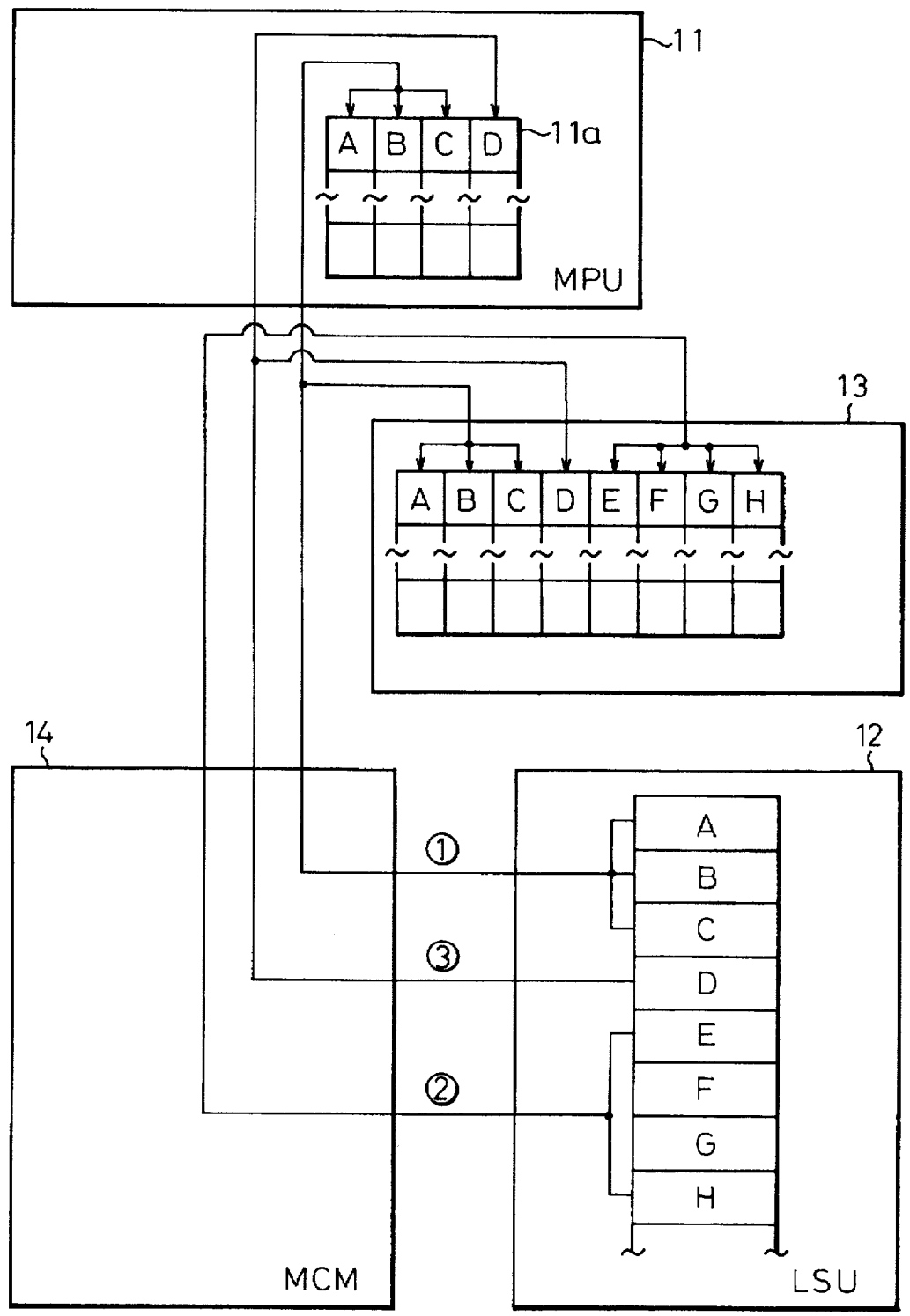
FIG. 1 is a block diagram showing the principle of the present invention.

The principle of the present invention will now be described with reference to FIG. 1.

The cache-data transfer system of the present invention consists of a micro processing unit (MPU) 11 operated in accordance with programs and including an internal cache memory 11a to be accessed at high speed, a local storage unit (LSU) 12 for storing programs and data to be processed, an external cache memory 13 provided outside of the MPU 11 and having larger capacity than the internal cache memory 11a, and a memory control module (MCM) 14 to control the LSU 12 and the external cache memory 13.

When the MPU 11 misses a data hit in the internal cache memory 11a and the external cache memory 13, the MCM 14 reads out the desired data from the LSU 12, and transfers the data to the internal cache memory 11a and external cache memory 13 from the LSU 12. For this transfer process, the MCM 14 makes the block size of the external cache memory 13 longer than the block size of the internal cache memory 11a by transferring data only to the external cache memory 13 from the LSU 12. Therefore, when the MPU 11 misses a data hit in the internal cache memory 11a, there is a high probability of hitting the data in the external cache memory 13. Therefore, the cache-hit rate and the processing speed of the MPU 11 is improved.

In this transfer process, the data to be transferred only to the external cache memory 13 are transferred before the last data which is transferred to the internal cache memory 11a and the external cache memory 13. The MPU 11 executes succeeding external accesses after receiving the last data into the internal cache memory 11a.

An embodiment of the present invention will now be described with reference to the related figures.

Figure 2:
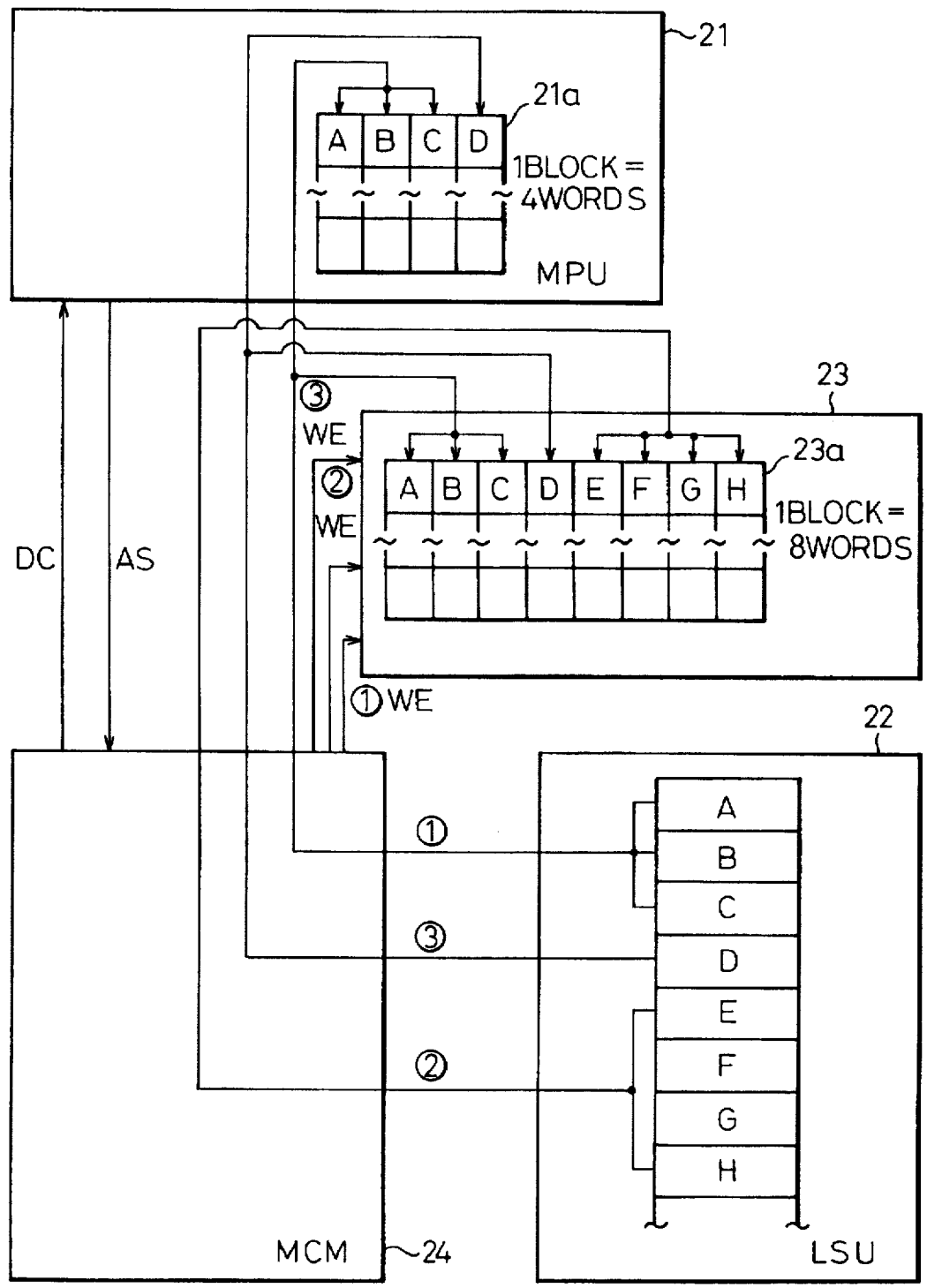
FIG. 2 is a block diagram showing the data transfer system of an embodiment according to the present invention.

FIG. 2 shows an outline of the data transfer system during transfer of data from a LSU.

In FIG. 2, a MPU 21 has an internal cache memory 21a, and the internal cache memory 21a has a number of blocks each formed by 4 words (=16 bytes). A LSU 22 can store data every one word such as A, B, C, D, E, F, G, H. An external cache memory 23 has a number of short blocks 23a each formed by 8 words (=32 bytes).

A MCM 24 can transfer one word (=4 bytes) as a minimum transfer unit from the LSU 22 to the internal cache memory 21a in the MPU 21 and the external cache memory 23, and can simultaneously transfer 8 words at maximum.

When the MPU 21 cannot obtain desired data from the internal cache memory 21a, the MPU 21 outputs an address strobe signal (AS) to the MCM 24, to instruct transfer of the data from the external cache memory 23 or the LSU 22 to the internal cache memory 21a of the MPU 21. If the MPU 21 hits the desired data in the external cache memory 23, the data is transferred to the MPU 21.

When the MPU 21 misses a data hit in the external cache memory 23, the MCM 24 outputs a write enable signal (WE) to the external cache memory 23 and a data transfer completion signal (DC) to the MPU 21, and the data transferred from the LSU 22 is written into the internal cache memory 21a and the external memory 23. In this transfer operation, the MCM 24 outputs the DC signal every one word, and outputs a number of WE signals equal to the number of the transferring words. For example, the WE signal is output three times when the data of three words are transferred.

The operation of the above system will now be described in detail with reference to the related figures.

Figure 3:
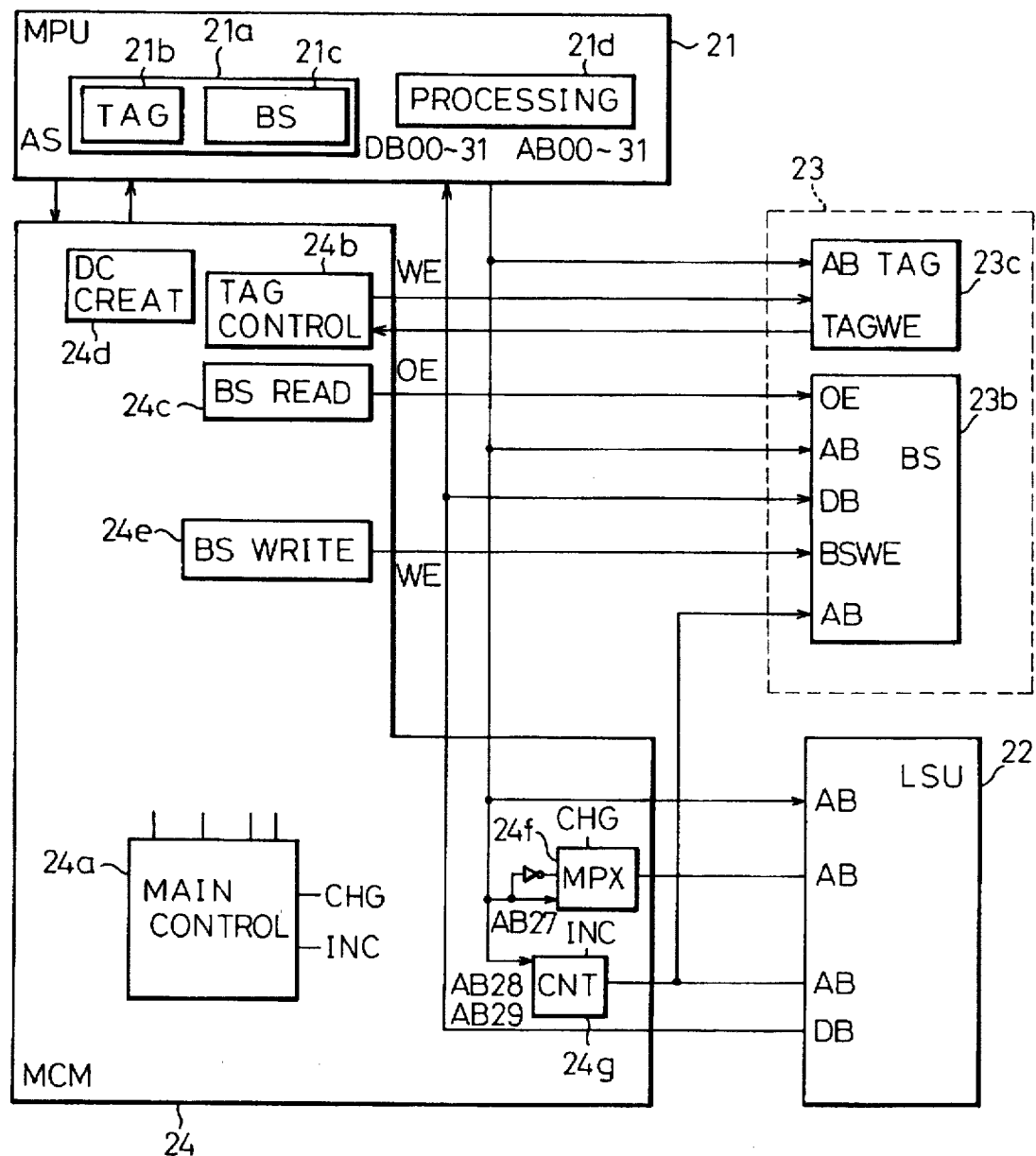
FIG. 3 is a block diagram showing the control method of an embodiment according to the present invention.

FIG. 3 shows an outline of the data transfer system to describe the operation of the embodiment. In FIG. 3, the MPU 21 checks whether or not the desired data is stored in a buffer storage (BS) 21c of the internal cache memory 21a by checking the indexes registered in a tag area (TAG) 21b by operation of a processing part 21d. According to the result, the MPU 21 decides whether to access the internal cache memory 21a or to access the external cache memory 21a and the LSU 22. When it is decided to access the external cache memory 21a and the LSU 22, the MPU 21 outputs the AS signal to MCM 24.

Programs and data which are necessary for the operation of the MPU 21 are stored in the LSU 22. The external cache memory 23 includes a buffer storage (BS) 23b to store copies of data in the LSU 22, and TAG 23c to store indexes of the data registered in the BS 23b.

A main control part 24a in the MCM 24 outputs determined signals which makes each part in the MCM 24 start when the main control part 24a receives the AS signal from the MPU 21. Each part in the MCM 24 operates as follows when it is started. A TAG control part 24b registers indexes in a TAG 23c in the external cache memory 23. A BS reading control part 24c controls reading of data from the BS 23b in the external cache memory 23. A BS writing control part 24e creates writing addresses of data, and controls writing of the data into BS 23b in the external cache memory 23. A DC signal creating part 24d, as a means to create a data transfer completion signal, creates a DC signal to use as a register timing signal for the internal cache memory 21a in the MPU 21, or informs the completion of transfer to the MPU 21. The main control part 24a designates a head address in the LSU 22 by a multiplexer (MPX) 24f as an address selecting unit and a counter (CNT) 24g as an address changing unit and creates addresses continued from the head address.

During a process of fetching an instruction or operand, when the MPU 21 hits the internal cache memory 21a, i.e., the MPU 21 finds a desired data registered in the internal cache memory 21a, the MPU 21 reads data from the internal cache memory 21a and does not access the external cache memory. On the contrary, when the MPU 21 fails to hit the internal cache memory 21a, i.e., the desired data is not registered in the internal cache memory 21a, then the MPU 21 outputs an AS signal to the MCM 24 for accessing the external cache memory 21a and the LSU 22.

Figure 4:
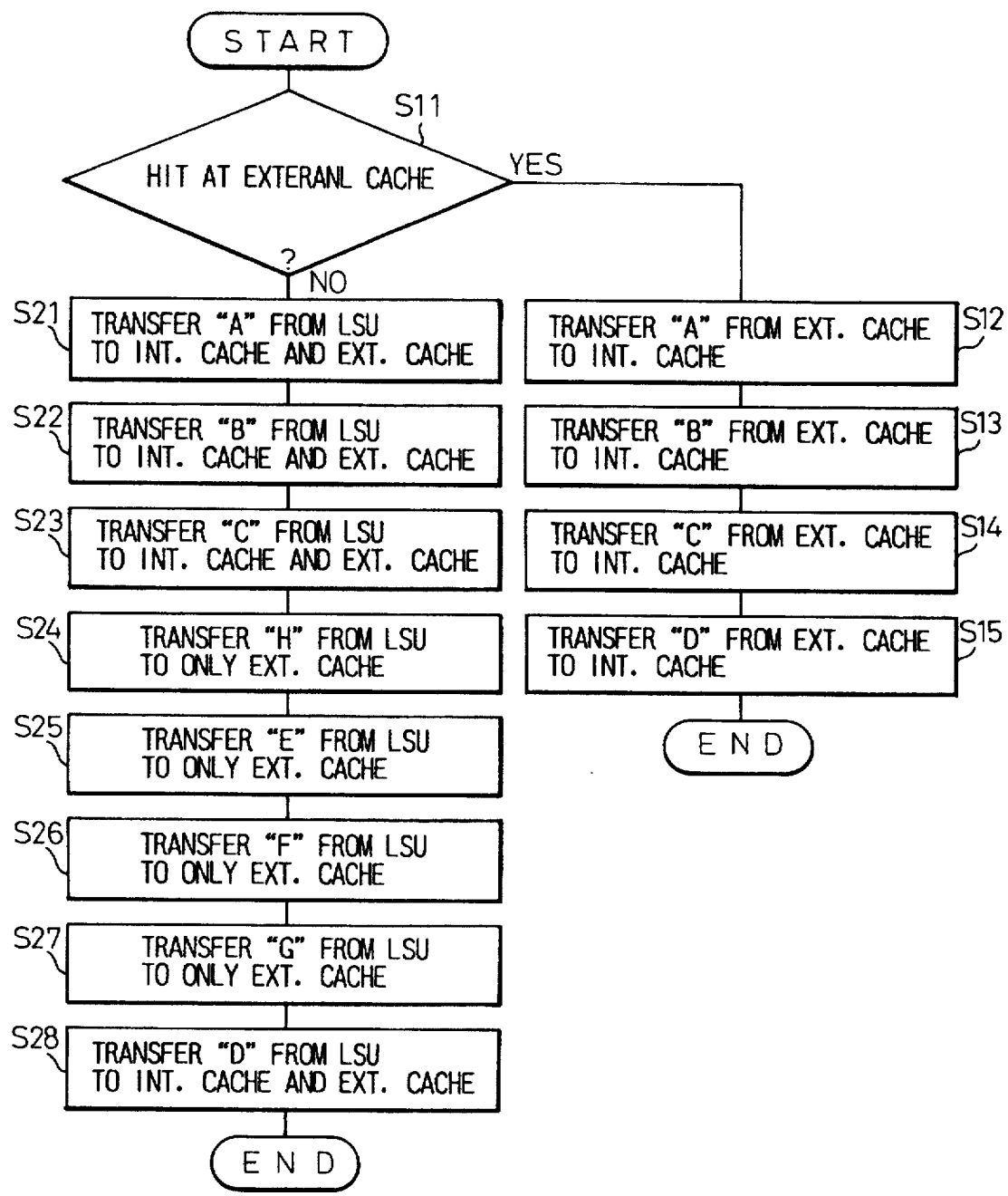
FIG. 4 is a flowchart showing the operation of a memory control unit according to the present invention.

The operation of the external cache memory 21a and the LSU 22 access will be described next with reference to the flowchart of FIG. 4.

In the MCM 24 which receives the AS signal, it is checked whether the data designated by the MPU 21 is registered or not in the external cache memory 23 by accessing the TAG 23c through the TAG control part 24b (step s11).

When the desired data are registered in the external cache memory 23 ("yes" at step s11), the data in the same block are sequentially transferred to the BS 21c in the internal cache memory 21a from the BS 23b (step s12–15) by receiving a reading instruction from the BS reading control part 24c.

On the contrary, if the desired data are not registered in the external cache memory 23 ("no" at step s11), the MCM 24 reads the data from the LSU 22, and registers the data into the internal cache memory 21a and the external cache memory 23.

When the MCM 24 reads the desired data from the LSU 22, the head address of the data is selected by a signal output from a MPX 24f, and the address is changed sequentially by increasing a value of a counter (CNT) 24g. Then, the data are transferred to the internal cache memory 21a and the external cache memory 23 as follows.

When the MCM 24 receives the AS signal and the address signal output by the MPU 21 at first, the MCM 24 reads data (A) at the corresponding address by word-unit from the LSU 22, outputs the DC signal to the MPU 21 through the DC signal creating part 24d, outputs the WE signal to the BS 23b trough the BS writing control part 24e, instructs the writing to the BS 23b, and registers the data into the internal cache memory 21a and the external cache memory 23 (step s21).

After that, in the MCM 24, the main control part 24a outputs an increment (INC) signal to the CNT 24g through an INC terminal. Then an address in the LSU and a BS writing address are increased by increasing the address in the CNT 24g. Data (B), i.e., the second word, which is stored at the increased address is read from the LSU 22, and is registered into the internal cache memory 21a and the external cache memory 23 (step S22), and the third data (C) is read from the LSU 22, and is registered into the internal cache memory 21a and the external cache memory 23 in the same way (step s23).

With regard to fourth data, the main control part 24a increases the address of the CNT 24g by inputting a signal to a INC terminal, and at the same time, reverses a signal AB27 of the MPX 24 by activating a CHG terminal. Then data (H) which exists in another block forming a counterpart of the first block is read out. At the same time, the MCM 24 does not output the register timing signal from the DC signal creating part 24d to MPU 21 but instructs a BS writing instruction from the BS writing control part 24e to the BS 24b of the external cache memory 23. Therefore, the fourth data is registered into only the BS 24b of the external cache memory 23 (step s24).

Thereafter, fifth–seventh data (E–G) is registered into only the external cache memory 23 in the same way (step s25–27).

With regard to eighth data, the main control part 24a increases the address of the CNT 24g by inputting a signal to the INC terminal, and at the same time, reverses a signal AB27 of the MPX 24f by negating the CHG terminal. Then, last data (D) of the first block is read out, and is registered into the internal cache memory 21a and the external cache memory 23 (step s28).

The relationship between the data and the address of the MPX 24f and the CNT 24g is as follows.

| DATA | MPX<br>AB27 | CNT<br>AB28 | AB29 |
|---|---|---|---|
| A | 0 | 0 | 0 |
| B | 0 | 0 | 1 |
| C | 0 | 1 | 0 |
| H | 1 | 1 | 1 |
| E | 1 | 0 | 0 |
| F | 1 | 0 | 1 |
| G | 1 | 1 | 0 |
| D | 0 | 1 | 1 |

Figure 5:
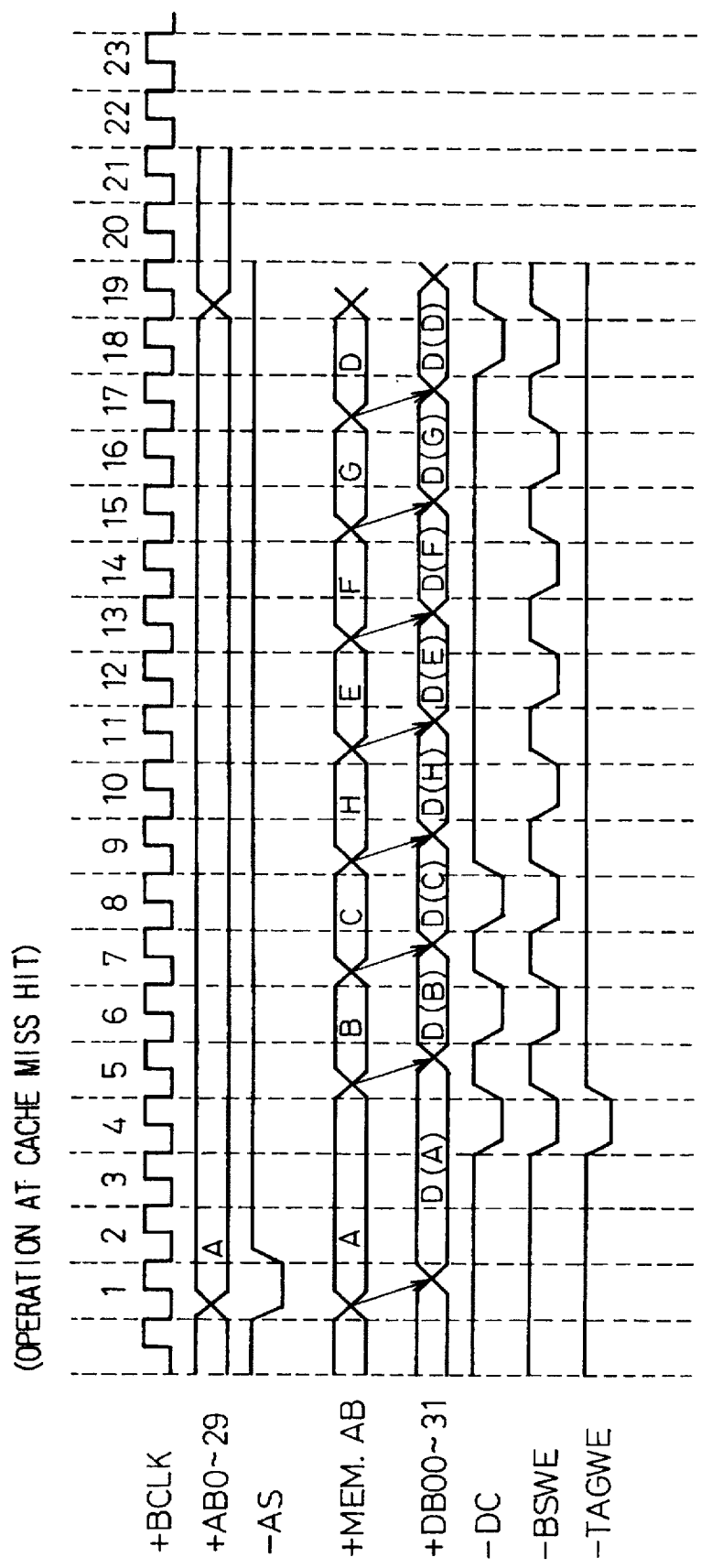
FIG. 5 is a time chart showing the operation of the memory control unit of the embodiment.

A timing chart of the above operation is shown in FIG. 5. In the figure, four clock cycles are required to transfer the data A for first access to the LSU 22, and with regard to other succeeding data requires half as much time.

The MPU 21 executes the next external access after receiving the DC signal for the data of the last one word from the DC creating part 24d in the MCM 24. Therefore, bus conflicts can be prevented. With regard to the internal access of the MPU 21 during the registering to only the external cache memory 23, the MPU 21 will hit a desired data among the three data which are registered in advance in the internal cache 21c. Therefore, the MPU 21 access time is minimized.

We claim:

1. A cache-data transfer system comprising:

storage means for storing programs and data to be processed;

a microprocessor operated in accordance with the programs and using the data, said microprocessor comprising an internal cache memory comprising a number of first blocks, each of the first blocks comprising M words, said internal cache memory receiving and storing the data consecutively stored in the storage means, wherein M is an integer;

an external cache memory coupled to the microprocessor and comprising a number of second blocks, each of the second blocks comprising N words, said external cache memory receiving and storing the data consecutively stored in the storage means, wherein N is an integer larger than M; and memory control means for controlling a data transfer process transferring data from the storage means to the internal cache memory and the external cache memory according to the following sequence:

first, said memory control means consecutively transferring data corresponding to up to M-1 words from the storage means to one of said first blocks of the internal cache memory and to one of said second blocks of the external cache memory leaving a space of at least one word-unit in said one of said first blocks and said one of said second blocks empty, second, said memory control means consecutively transferring data corresponding to up to N-M words from the storage means only to said one of said second blocks of the external cache memory, and third, said memory control means consecutively transferring data corresponding to at least one word to the empty word-unit of said one of said first blocks of the internal cache memory and that of said one of said second blocks of the external cache memory, said microprocessor executing a next data transfer process after said empty word-unit in said one of said first blocks of the internal cache memory receives the data from the storage means.

2. A cache-data transfer system according to claim 1, wherein:

the internal cache memory comprises a buffer storage storing data and a tag area registering indexes.

3. A cache-data transfer system according to claim 1, wherein:

the external cache memory comprises a buffer storage storing data and a tag area registering indexes.

4. A cache-data transfer system according to claim 1, wherein:

the memory control means executes the data transfer process transferring data from the storage means to the internal cache memory and the external cache memory when the microprocessor executes a cache miss to each of the internal cache memory and the external cache memory.

5. A cache-data transfer system according to claim 3, wherein the memory control means comprises:

tag control means for controlling the tag area of the external cache memory, reading control means for controlling reading from the buffer storage of the external cache memory, and writing control means for controlling writing to the buffer storage of the external memory.

6. A cache-data transfer system according to claim 1, wherein the memory control means comprises:

data transfer completion signal creating means for outputting a transfer completion signal to the microprocessor if a minimum unit of data is transferred, and address change means for increasing an address of data transferred from the storage means.

7. A cache-data transfer system according to claim 6, wherein the memory control means comprises address selecting means for selecting a data block transferred from the storage means.

8. A cache-data transfer system according to claim 7, wherein the address change means comprises a 2-bit counter, and the address selecting means comprises a 1-bit multiplexer.

9. A cache-data transfer system according to claim 1, wherein M is equal to four and N is equal to eight.

10. A cache-data transfer system according to claim 1, wherein said one word-unit of said one of said first blocks being left empty is a last word-unit of said one of said first blocks.

* * * * *